Oct. 20, 1925.
H. M. LAMBERT
1,558,019
METHOD OF MANUFACTURING CUSHION TIRES
Filed April 11, 1924     3 Sheets-Sheet 1
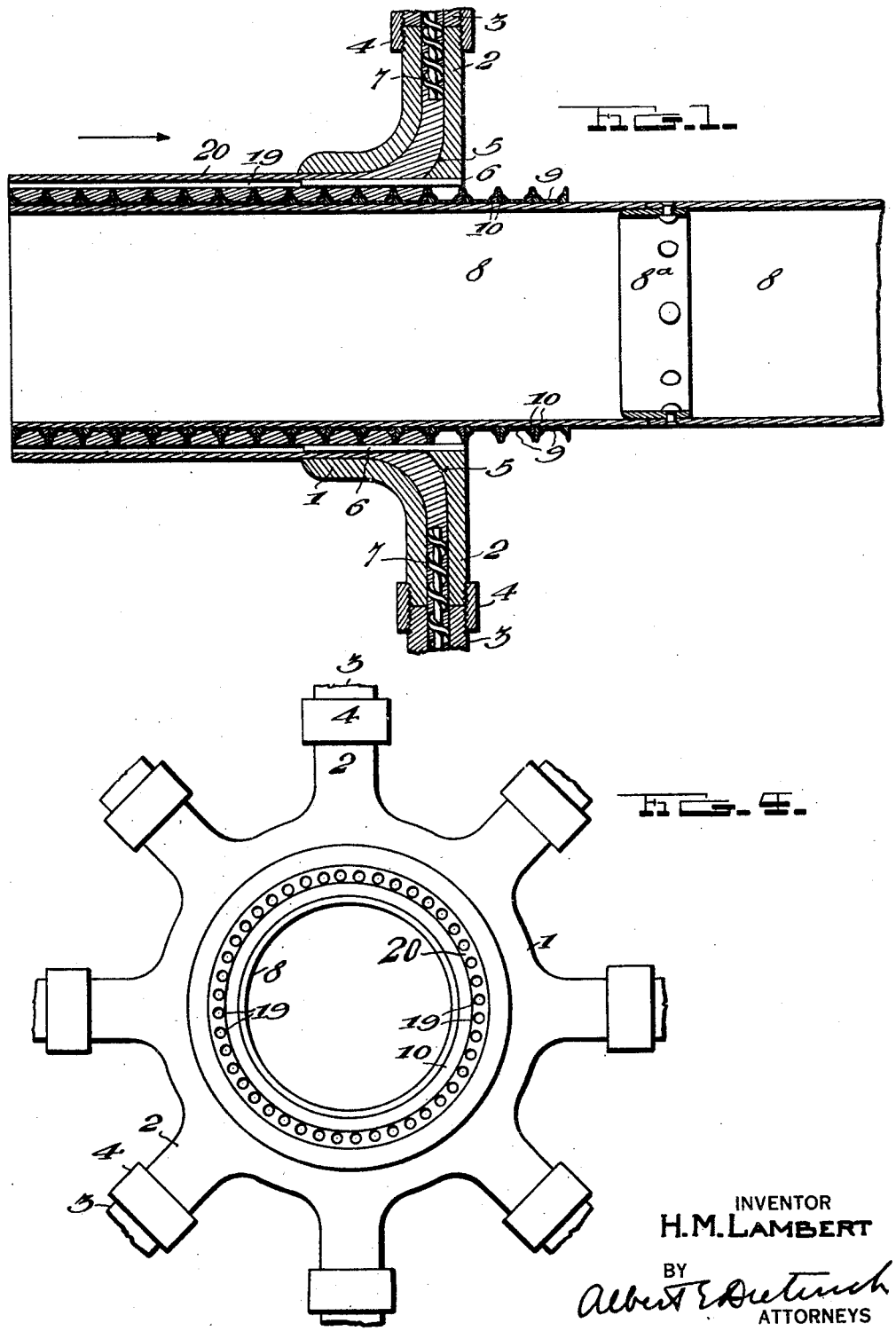
INVENTOR
H. M. LAMBERT
BY
ATTORNEYS

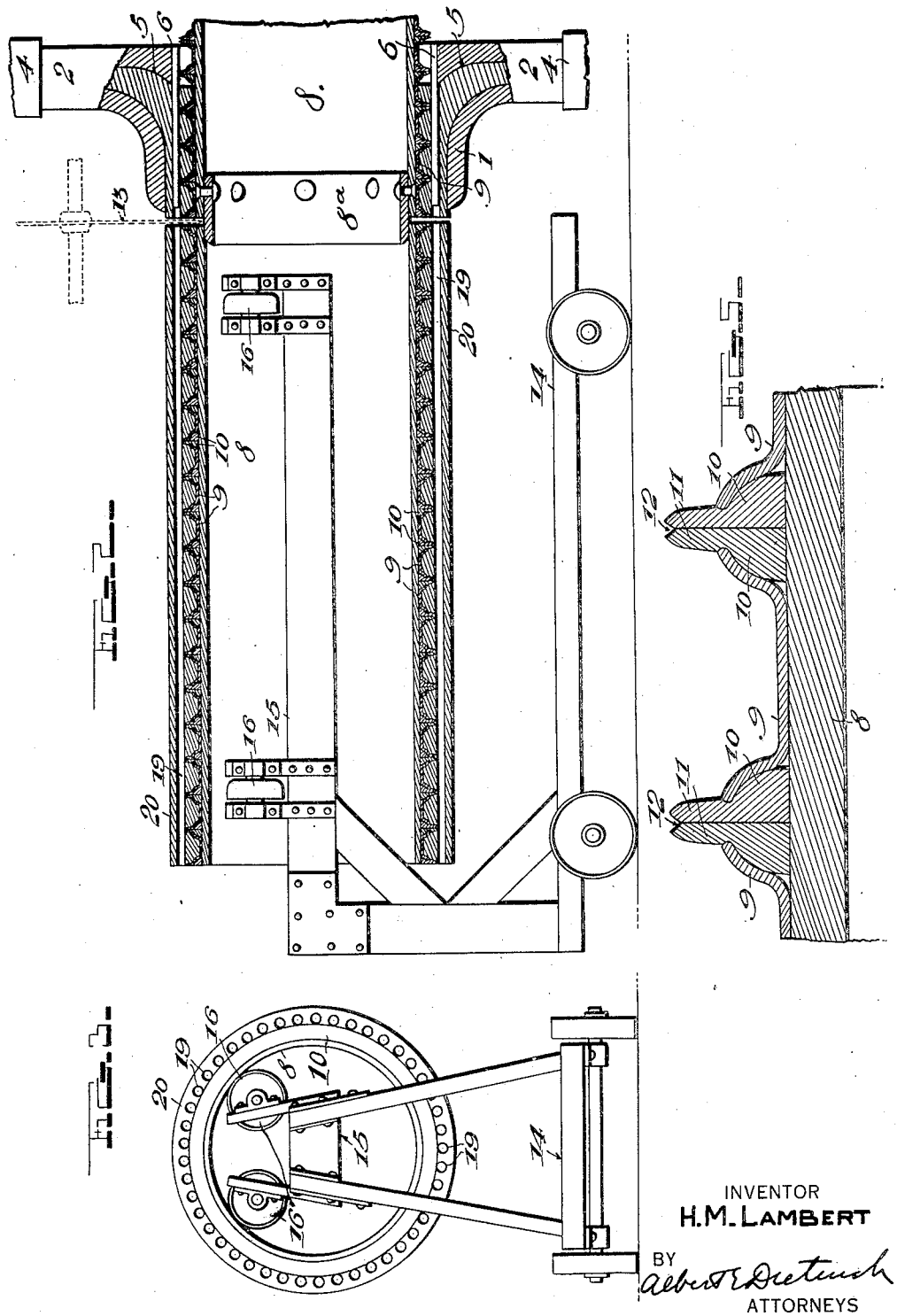

Oct. 20, 1925.
H. M. LAMBERT
METHOD OF MANUFACTURING CUSHION TIRES
Filed April 11, 1924   3 Sheets-Sheet 3
1,558,019
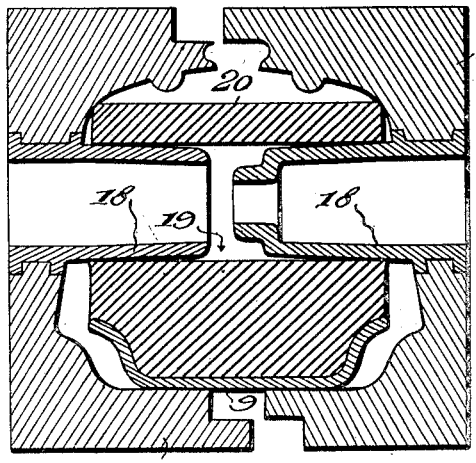
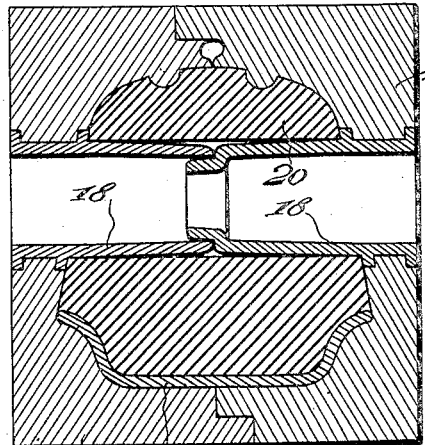
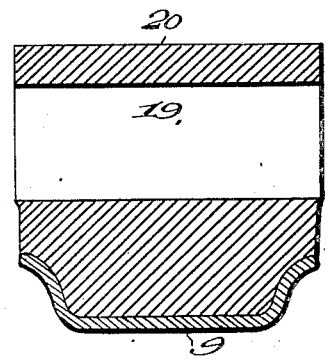
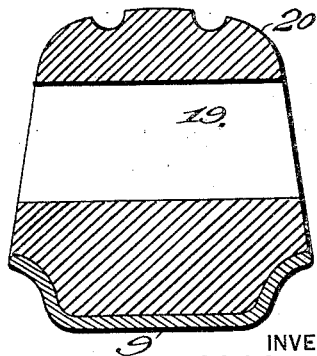
INVENTOR
H.M. LAMBERT
BY
ATTORNEYS Patented Oct. 20, 1925.

1,558,019

UNITED STATES PATENT OFFICE.

HENRY M. LAMBERT, OF PORTLAND, OREGON, ASSIGNOR TO LAMBERT TIRE & RUBBER CO., OF AKRON, OHIO, A CORPORATION OF ARIZONA.

METHOD OF MANUFACTURING CUSHION TIRES.

Application filed April 11, 1924. Serial No. 705,929.

*To all whom it may concern:*

Be it known that I, HENRY M. LAMBERT, a citizen of the United States, residing at Portland, in the county of Multnomah and State of Oregon, have invented a new and Improved Method of Manufacturing Cushion Tires, of which the following is a specification.

My invention relates to the art of manufacturing cushion tires and particularly cushion tires of the ventilated type namely, that type in which the tire body is composed of solid rubber with holes or passages transversely through the same.

The common method of manufacturing such tires at present in use is to take a rim and build up the tire structure on the rim by winding strips of rubber circumferentially around the rim, interposing transverse rubber blocks at proper intervals to locate the transverse holes and then placing the built up mass in a shaping mold and vulcanizing the same into an integral structure; another method is sometimes used which is to die-express the rubber from a tube machine in a longitudinal strip of the desired cross section of the tire, cut the strip and wind it around the rim once, fitting the ends together and either placing the mass in a mold and vulcanizing it or wrapping the same and then vulcanizing the mass in the wrapper. Both of these methods are objectionable in that the labor cost is considerable because of the difficulty in gaging the quantity of rubber to a nicety in order to avoid waste, which is caused by the excess rubber oozing out of the mold as the mold closes; there is also the difficulty in effecting a perfect union of the lapped ends of the die-expressed strip when that method is used.

It has also been proposed to manufacture these tires by filling the rim with a base structure in the usual manner and die-expressing in tube form the rubber from which ring-blanks are cut and then stretching the ring-blanks over the rim filler, placing the mass in a shaping and vulcanizing mold and vulcanizing the same. This latter method while eliminating many of the objections of the first two methods referred to does not reduce the expense of manufacture to the minimum, and it is therefore an object of my invention to provide a method of manufacturing cushion tires in which the expense of manufacture in labor cost is reduced to the minimum and the necessity of preliminarily filling the rim, and then stretching the rubber blank over the rim is avoided.

My invention in its generic nature consists in die-expressing the rubber directly onto the rims in the form of a continuous band or tube and then severing the mass to separate one rim and its contents from the remainder of the expressed tube or ring of rubber and thereafter placing the rim with its tire blank in the shaping and vulcanizing mold to complete the process of manufacture.

In its more specific nature, my present method consists in taking a series of rims and arranging the same side by side in juxtaposition with their axes substantially coincident and forming around the rims a tube or pipe of rubber which fills the rim and extends radially from the same to a sufficient depth so that when the mass is supported between adjacent rims the mass on each rim will constitute a seamless tire ring-blank, the method consisting further in severing a group of rims with a continuous section of rubber tubing or piping in which the rims are embedded from an adjacent like mass and then cutting the rubber tubing or piping between adjacent rims to form individual tire and rim units; these units are thereafter placed in suitable shaping and vulcanizing molds and vulcanized under pressure to the final desired contour and size of the finished tire.

In carrying out my method of manufacturing cushion tires any suitable apparatus may be employed but I prefer to employ a special apparatus which constitutes the subject matter of a copending application filed April 11, 1924, Serial No. 705,928, and which is illustrated in the accompanying drawings, by reference to which it will be seen that:

Figure 1 is a vertical longitudinal section illustrating the apparatus employed and the manner of conducting my invention with the assistance of the same.

Figure 2 is a view similar to Figure 1, also illustrating the manner of conducting my invention and showing a section of the mass severed from the remainder and received on a carriage to be taken to a lathe or cutting machine by which the individual rim-tire units are cut apart.

Figure 3 is an end view of the carriage and its contents shown in Figure 2.

Figure 4 is an end view of the parts shown in Figure 1, looking in the direction of the arrow.

Figure 5 is an enlarged detail view of a portion of the mandril or receiving pipe on which the rims are placed and also showing the rim spacer and separating blanks.

Figure 6 is a detail section of a rim-tire unit before being placed in the shaping and vulcanizing mold.

Figure 7 is a cross section of a shaping and vulcanizing mold with a rim-tire unit in place before closing the mold.

Figure 8 is a view similar to Figure 7 with the mold closed.

Figure 9 is a view showing the completed tire after vulcanizing and being removed from the mold.

In carrying out my invention it should be understood that the rim surfaces to receive the rubber are treated in the usual way with a suitable composition to cause the rubber to adhere to the rims. The rims, indicated by 9 in the drawings, are then placed on the mandril 8, which mandril consists of a length of piping or tubing of suitable diameter to hold the rims properly. The mandril 8 is made of pipe lengths or sections each carrying a lapping ring 8ª to facilitate lining up the mandril sections as they are fed through the expressing die 1.

The expressing die 1 is so designed as to be fed from a number of tube machines through nozzles 2 which are coupled at 4 with the outlets 3 of the tube machines (the tube machines not being illustrated as they may be of any approved construction). The ducts for delivering the rubber through the die 1 are curved or deflected forwardly as at 5 for a purpose presently to appear, and the rubber mass is fed to these ducts from the tube machines by the usual screws 7 or other suitable pressure applying mechanism as may be found desirable.

When the tires to be constructed are of the ventilated type the die 1 is provided with rods 6 which form the holes in the rubber as it is expressed from the dies.

The rims 9 are placed seriatim on the mandril 8 alternately with pairs of spacer rings 10 that have portions 11 projecting beyond the edges of the rims and have abutting faces lying in planes normal to the axis of the mandril, the outer edges of the abutting faces being bevelled as indicated at 12 to facilitate entrance of the cutting and parting knife indicated at 13 in Figure 2 of the drawings.

In carrying out my method with the use of the apparatus mentioned, the rims and spacer blocks are threaded onto a section of mandril 8 and passed into the central opening of the die 1 from right to left in Figure 1 until the first rim lines up with the die ducts 5 to receive the rubber from the die. The screws 7 are then started into operation to express the rubber through the channels 5 onto the rims, and the channels 5, being forwardly directed, the movement of the rubber tends to advance the rims and mandril 8 from right to left in Figure 1, and pass it through the die while at the same time the rims are being filled and covered by a continuous seamless tube of rubber issuing from the die 1, as shown in Figures 1 and 2 of the drawings. When a mandril 8 has about been fed through the die, a second mandril 8 with its rims in place is engaged with the first one, somewhat in the manner indicated in Figure 1 (the rims on the second mandril being omitted in the illustration) and the process is therefor a continuous one. As the forward end of a mandril clears the die 1 it is received on rollers 16 mounted on the arm 15 of a suitable carriage 14 and as soon as the rear end of the mandril section 8 passes out from the die 1 a suitable cutting knife 13 is employed to cut the rubber and separate the first mandril with its contents from the following one, it being understood, of course, that the knife 13 is carried around the circumference of the mass until the mass is completely severed. After which, the carriage 14 is removed, with its mandril and contents, to a suitable lathe, where the individual units are cut apart to separate them along the planes of the contacing faces of the spacer rings 11—11, which planes are normal to the axis of the mandril, thereby producing the individual rim-tire-blank units. These units, one of which is shown in Figure 6, are then placed in the usual shaping and vulcanizing molds shown in Figures 7, 8 and 9. These molds usually consist of mating sections 17 carrying pins 18 to enter the holes 19 of the tire-blank 20, the holes 19 being the ones formed by the rods 6 as the rubber mass is expressed from the die 1, the pins 18 serving to maintain these holes while the rubber is displaced to fill the molding cavity of the mold and give the required shape to the tire, the finished tire being shown in Figure 9. It should be understood that the width of the spacer rings 11—11 is so designed as to give the required excess of rubber in the blank to fill, when displaced, the cavity of the mold chamber when the mold is closed without being such an excess as will cause a decided overflow or wastage of material when the mold is closing. By my method and the use of the apparatus designed to carry it out, the quantity or rubber used can be gaged so as to avoid this waste now so common.

O course, if the tire is to be a solid rubber one, without the holes, the die 1 would have the pins 6 omitted.

While I prefer to use the apparatus such as indicated in the accompanying drawings, in carrying out my method it is quite obvious that other apparatus may be used with more or less efficiency and the method of manufacture is, of course, independent of any particular apparatus.

From the foregoing description, taken in connection with the accompanying drawings, it is thought the method of manufacturing tires and its many advantages will be clear to those skilled in the art.

What I claim is:—

1. In a method of manufacturing cushion tires, the steps which consist in arranging a series of rims adjacent one another with their axes substantially coincident, and covering the mass with an envelope of rubber of the thickness of the desired tire-blank, then cutting the envelope in planes normal to the axis of the rims and between adjacent rims thereby to separate the mass into individual rim-tire blanks.

2. In a method of manufacturing cushion tires, the steps which consists in arranging a series of rims adjacent one another with their axes substantially coincident, and covering the mass with an envelope of rubber of the thickness of the desired tire-blank, then cutting the envelope in planes normal to the axis of the rims and between adjacent rims thereby to separate the mass into individual rim-tire blanks, then placing the rim-tire blanks in shaping and vulcanizing molds to give the desired final form to the mass and vulcanize the same.

3. The method of manufacturing cushion tires which consists in threading a series of rims on a suitable mandril, enveloping the mass of rims, while on the mandril, with a continuous sheath of rubber of the thickness necessary to constitute tire-blanks, severing the sheath into sections between adjacent rims thereby to produce individual tire-blanks on their respective rims, and subsequently shaping and vulcanizing the blanks.

4. The method of manufacturing cushion tires which consists in placing a series of rims on a mandril in juxtaposition, die-expressing a tube of rubber directly onto and enveloping the series of rims on the mandril, severing the expressed mass in planes normal to the axis of the mandril between adjacent rims to produce individual tire blanks on their respective rims and subsequently vulcanizing said blanks.

5. The steps in the method of manufacturing cushion tires which consist in taking a series of rims, holding them side by side with their axes spaced coincident and covering the same with a seamless envelope of rubber filling the rims and projecting radially beyond the same to a sufficient distance to enable the production of tire-blanks of a desired thickness, severing a length of envelope with its contained rim from the remainder thereby to produce a tire-blank on a rim.

6. The method of manufacturing cushion tires which consists in embedding a series of rims in a seamless tube of rubber and then severing the tube into bands, each band containing one rim and constituting a tire-blank and thereafter vulcanizing the blank.

7. The method of manufacturing cushion tires which consists in embedding a series of rims in a seamless tube of rubber and then severing the tube into bands, each band containing one rim and constituting a tire-blank, and thereafter shaping and vulcanizing the blank by confining the rim and blank in a vulcanizing mold of the desired volume and contour.

8. The method of manufacturing cushion tires which consists in taking a series of rims, placing them side by side with their axes coincident, enveloping said rims in a seamless envelope of rubber, the external surface of which is a cylinder, and simultaneously providing longitudinal ducts in said envelope paralleling the axes of the rims and spaced around the axes of the rims, and thereafter severing the envelope between adjacent rims in planes normal to the axes of the rims, thereby leaving individual rims with tire blanks thereon, holding the shape of the holes in the blanks, and deforming the rubber of the blanks into the desired contour and dimensions, and, while holding the same so deformed, vulcanizing the blank to sustain its form.

HENRY M. LAMBERT.